United States Patent [19]

Gergely

[11] Patent Number: 4,612,456
[45] Date of Patent: * Sep. 16, 1986

[54] APPARATUS AND METHOD FOR GENERATING LIGHT HAVING A WAVELENGTH IN THE RANGE OF APPROXIMATELY 250–550 NANOMETERS

[75] Inventor: John S. Gergely, Ponca City, Okla.

[73] Assignee: Conoco Inc., Ponca City, Okla.

[*] Notice: The portion of the term of this patent subsequent to Aug. 27, 2002 has been disclaimed.

[21] Appl. No.: 414,405

[22] Filed: Sep. 2, 1982

[51] Int. Cl.⁴ .............................................. G02F 1/35
[52] U.S. Cl. .................................... 307/425; 307/427; 350/96.18; 372/5
[58] Field of Search .............. 350/96.1, 96.15, 96.18; 307/425, 427; 372/70, 5, 21; 250/372

[56] References Cited

U.S. PATENT DOCUMENTS

| | | | |
|---|---|---|---|
| 3,582,814 | 6/1971 | Duguay et al. | 372/51 |
| 3,753,146 | 8/1973 | Reynolds et al. | 372/54 |
| 4,410,235 | 10/1983 | Klement et al. | 350/96.18 |
| 4,420,219 | 12/1983 | Muchel | 350/96.18 |

OTHER PUBLICATIONS

Article entitled, "Frequency Doubling Crystals—Unscrambling the Acronyms", by R. S. Adhav and M. Orszag, Quantum Technology, Ltd., Agincourt, Ontario, Canada.

Article entitled, "Doubling Flashlamp-Pumped Dye Output, Los Alamos Obtains 50 mg at 270 nm," *Laser Focus,* Jan., 1977, p. 32.

Article entitled, "Remote Analysis with Lasers and Fibers, " *Optical Spectra,* May, 1980, p. 18.

Article entitled, "Second Harmonic Generation in 90° Phase-Matched KDP Isomorphs," *IEEE Journal of Quantum Electronics,* Aug., 1973, pp. 855, 856.

*Primary Examiner*—James W. Davie
*Attorney, Agent, or Firm*—Charles E. Quarton

[57] ABSTRACT

A source of linearly polarized light having a wavelength selected from the range of about 500 to 1100 nanometers provides light into one end of an optical fiber. A nonlinear crystal of the type that mixes the frequency of light passing therethrough is positioned adjacent the other end of the fiber. The fiber transmits light from the source to the crystal which increases its frequency up to 100%, dependent upon crystal selection, thereby providing light in the 250–550 nanometer wavelength range. Adjusting the radial orientation of the crystal with respect to the fiber optimizes conversion of light to the 250–550 nanometer range.

8 Claims, 4 Drawing Figures

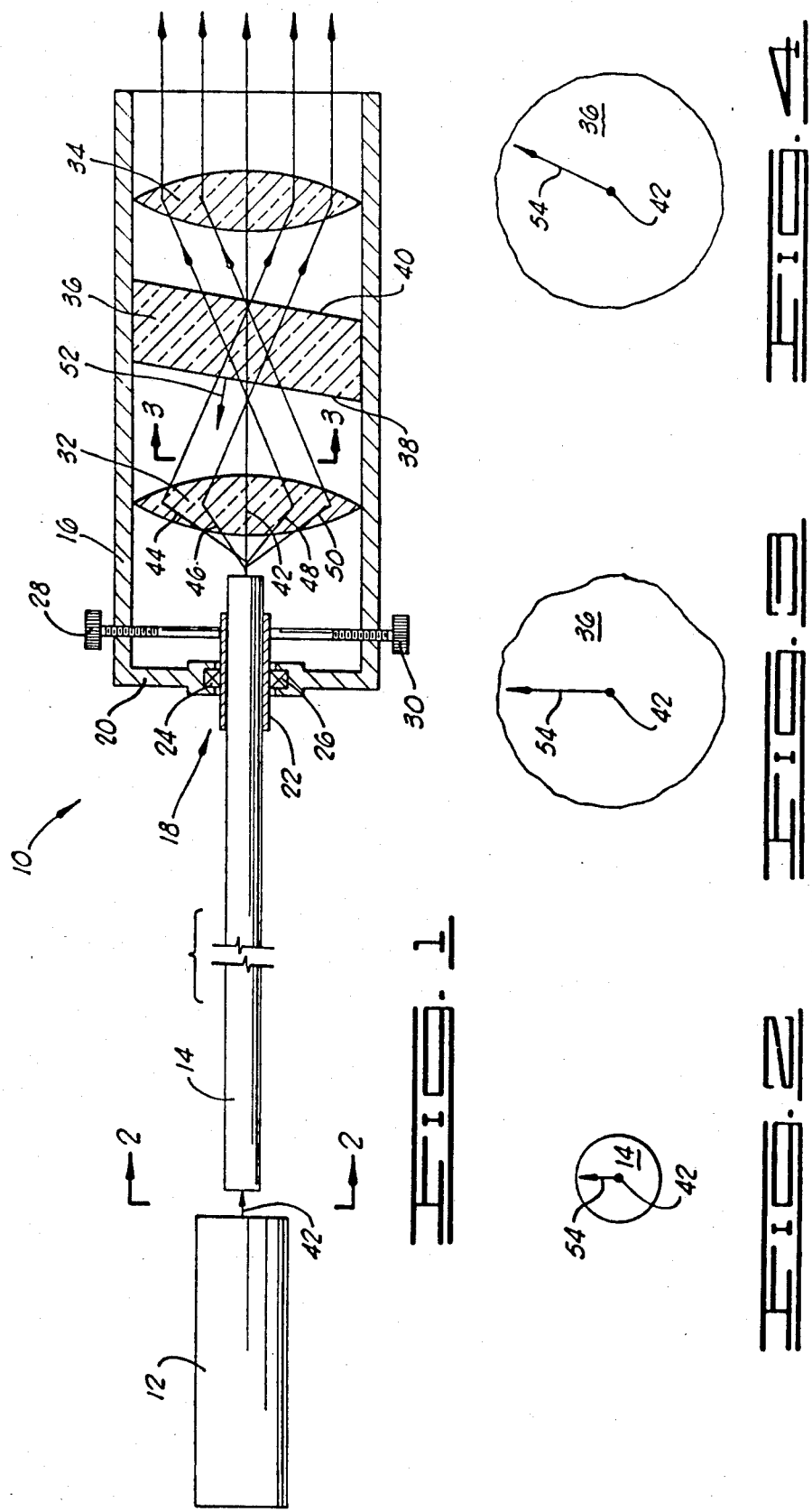

APPARATUS AND METHOD FOR GENERATING LIGHT HAVING A WAVELENGTH IN THE RANGE OF APPROXIMATELY 250–550 NANOMETERS

BACKGROUND AND SUMMARY

The instant invention relates to an apparatus and method for generating light having a frequency in the range of approximately 250–550 nanometers, and more particularly to such an apparatus and method which utilizes a source of linearly polarized light to generate such light.

There are several applications for use of light having a wavelength in the range of 250–550 nanometers in which the light is used to irradiate a sample in order to determine the presence or absence of a substance in the sample. For example, as described in U.S. Pat. No. 4,446,370, for APPARATUS FOR DETECTING OIL IN WATER by the instant inventor and assigned to the assignee of the instant application, ultraviolet light may be shined into a portion of the water while monitoring for fluorescence which indicates the presence of oil. Likewise, ultraviolet light is used to irradiate core samples taken from a well bore in order to determine whether oil may be present in the sample. Alternatively, instead of removing the sample from the well bore, a source of ultraviolet light may be lowered into the bore for irradiating subsurface formations at different levels.

In each of the above applications, it may be necessary to provide a light source at relatively inaccessible locations, e.g., submerged in a body of water or lowered into a well bore. It has been found in the past that using optical fibers for transmission of ultraviolet light is not effective due to attenuation by the fibers of light in the ultraviolet range.

It is a general object of the present invention to provide a source of light having a wavelength in the range of 250–550 nanometers at a location remote from a linearly polarized light source, the light of which is used to generate such remote light.

It is a more specific object of the invention to provide such a method and apparatus which utilizes optical fibers to transmit the linearly polarized light at its optimum frequency for fiber transmission.

The apparatus includes a source of linearly polarized light and an optical fiber for transmitting such light therealong. A frequency-doubling crystal is positioned adjacent one end of the fiber so that such transmitted light passes therethrough. The transmitted light is selected from substantially the 500 to 1100 nanometer wavelength range which is optimum for transmission along optical fibers. The transmitted light which emerges from the crystal includes light in the 250–550 nanometer range, such light being twice the frequency of the transmitted light. A frequency-mixing crystal may be used in lieu of the frequency-doubling crystal to obtain further variation in the wavelength of the produced light.

These and other attendant advantages and objects of the instant invention will become more fully apparent as the following detailed description of a preferred embodiment of the invention is read in view of the accompanying drawings.

FIG. 1 is a view of a preferred embodiment of the invention partially in schematic form, a portion being shown in cross-section.

FIG. 2 is an enlarged partial view taken along line 2—2 in FIG. 1.

FIG. 3 is a partial view taken along line 3—3 in FIG. 1.

FIG. 4 is the view of FIG. 3 with the optical fiber having a slightly different radial orientation with respect to the housing than in FIG. 3.

DETAILED DESCRIPTION OF THE INVENTION

Indicated generally at 10 in FIG. 1 is apparatus constructed in accordance with the instant invention for generating light in the 250–550 nanometer wavelength range. Included therein is a conventional laser 12 which acts in a well-known manner to generate a source of linearly polarized light for transmission within a conventional optical fiber 14. In the instant embodiment of the invention, light so generated is substantially in the 600 to 800 nanometer wavelength range. Light in this range is optimum for transmission along fiber 14 since attenuation of such light is minimized during transmission.

Fiber 14 is connected to a cylindrical housing 16 via a slip ring, indicated generally at 18. Slip ring 18 is mounted on a rear circular portion 20 of housing 16 which serves to enclose one end of housing 16 around the slip ring.

The slip ring includes a cylindrical tube 22 which is snugly fitted about the circumference of fiber 14. A plurality of bearings, two of which are bearings 24, 26 are contained within portion 20 about the circumference of tube 22 and serve to rotatably support the tube (and hence the optical fiber).

Lock screws 28, 30 are each threadably engaged in bores contained in and passing through housing 16. The lower end of each of lock screws 28, 30 abut against tubing 22 and serve to restrain the tubing from rotation.

A pair of conventional lenses 32, 34 are each mounted about their circumference on the interior of housing 16. Although not visible in the drawing, conventional means are provided to enable moving lenses 32, 34 along the axis of housing 16, that is, toward and away from end portion 20.

Also mounted about its circumference within the housing is a conventional frequency-doubling crystal 36. Included within the crystal are a front surface 38 and a rear surface 40. Crystal 36 is a nonlinear crystal of the type which affects light passing therethrough by doubling its frequency. Examples of such crystals are potassium dihydrogen phosphate and ammonium dihydrogen phosphate. Other nonlinear crystals, which may be effectively used in accordance with the instant invention, are frequency-mixing crystals which affect light passing therethrough by increasing its frequency up to 100%. As used herein, "nonlinear crystals" refer to both frequency-mixing and frequency-doubling crystals.

Crystal 36 is surrounded by an index-matching fluid which is contained in the space between lenses 32, 34. The fluid has an index of refraction close to that of lenses 32, 34 and of crystal 36, and as will later become more fully apparent, helps to minimize relection losses of light passing through housing 16.

A light ray 42 is indicated in FIG. 1 with an arrow as shown. Ray 42 indicates the direction of propagation of a ray of light emitted from fiber 14 when laser 12 is energized. Additional rays 44, 46, 48, 50 are likewise indicated by arrows and serve to indicate the direction of propagation of other light rays emitted from fiber 14.

A normal vector 52 is shown to indicate an axis perpendicular (normal) to surface 38. In FIGS. 2 and 3, an electric-field vector 54 is shown to indicate the polarization of the electric field propagating along ray 42.

In operation, laser 12 emits linearly polarized light which is shined into fiber 14 for transmission into housing 16. When the light emerges from fiber 14 into housing 16, it propagates in a manner indicated by rays 42, 44, 46, 48, 50. It is to be appreciated that dependent upon the position of lens 32 with respect to the end of bundle 14, the rays may be collimated (placed into parallel alignment) or focused (converged) to varying degrees into the doubling crystal. In FIG. 1, lens 32 is positioned to focus light rays emerging from bundle 14.

Since the light emitted from the laser is linearly polarized, such emitted light includes an electric-field vector which lies along a fixed line normal to the direction of propagation of the light. Due to the conventional structure of fiber 14, the linear polarization as well as the substantial degree of such polarization of light is preserved after transmission through the fiber. As can be seen, electric-field vector 54, in FIG. 3 retains substantially the same direction of polarization as that of light entering fiber 14, the orientation of such entering light being shown by vector 54 in FIG. 2.

In order to maximize doubling of light by crystal 36, it is necessary for light entering the crystal to be aligned with the optic axis of the crystal. In addition, to increase the amount of light being doubled, surface 38 may be cut so that vector 54 lies in the plane of incidence while at the same time being aligned with the optic axis of the crystal. Light so entering the crystal is parallel polarized light. The plane of incidence is a plane which is normal to surface 38 and which includes a nonaskew ray defining the direction of light propagation—for example, ray 42.

In order to minimize reflective losses it is desirable for light rays approaching crystal surface 38 to do so at Brewster's angle. The tangent of this angle is defined as being N2 divided by N1, where N2 is the index of refraction of the crystal and N1 is the index of refraction of the index-matching fluid which, as will be recalled, is contained in the volume between lenses 32, 34. Ideally, if the index of refraction of the crystal and the fluid are very nearly the same, reflective losses are minimized regardless of the angle of approaching light rays.

As can be seen in FIG. 1, depending upon the axial position of lens 32 within housing 16 and depending upon the angle of crystal surface 38 with respect to the housing, light rays approach the crystal surface from a plurality of angles within a converging cone of light. Thus, all of the rays may not be parallel polarized nor may they all approach the crystal front at Brewster's angle. However, when lens 32 is adjusted to provide collimated light entering crystal 36, the impinging light will no longer be confined within a cone, but rather within a cylinder. In this case, all of the light entering the crystal is parallel polarized and if crystal surface 38 is cut at Brewster's angle, the incident ray will strike the crystal surface at Brewster's angle. Maximum doubling will occur somewhere between fully collimated light entering the crystal and light being focused within the crystal by lens 32. To optimize production of ultraviolet light emerging from housing 16 through lens 34, thumb screws 28, 30 are loosened and tubing 22 is rotated until the quantity of light in the ultraviolet range which emerges from housing 16 is at a maximum.

Lens 34 may be moved along the axis of the housing for collimating, diverging or focusing the light emitted from the crystal.

It is to be appreciated that modifications and additions may be made to the instant embodiment of the invention without departing from the spirit of the invention which is defined in the following claims.

What is claimed is:

1. Apparatus for generating ultraviolet light at a remote position comprising:
    a source of linearly polarized light having a wavelength range of about 500 to 1100 nanometers;
    a non-linear crystal;
    an optical fiber having one end positioned adjacent said light source to permit transmission of said light within said fiber and the other end positioned adjacent said crystal to receive transmitted light therethrough;
    a pair of lenses, one lens interposed between the other end of said fiber and said crystal and the other placed adjacent said crystal in the path of light emerging therefrom; and
    index-matching fluid having an index of refraction that is substantially the same as said lenses and said crystal, said fluid occupying the space between said lenses in envelopment of said non-linear crystal;
    whereby light emanating from said non-linear crystal is much increased in frequency relative to the linearly polarized light from said source.

2. The apparatus of claim 1 which further includes means for selectively fixing the radial orientation of said crystal relative to said fiber.

3. The apparatus of claim 1 wherein the side of said crystal adjacent the other end of said fiber is oriented at Brewer's angle.

4. Apparatus as set forth in claim 1 wherein:
    said light emanting from the non-linear crystal has a wavelength in the ultraviolet range of 250-550 nonometers.

5. Apparatus as set forth in claim 1 which further includes:
    means for selectively collimating the light transmitted through said other lens.

6. Apparatus as set forth in claim 1 which further includes:
    means for selectively focusing the light transmitted through said other lens.

7. A method for providing light at a location remote from a source of polarized light used to generate such light, such provided light having a high frequency with respect to the source light, comprising the steps of:
    transmitting such polarized light in an optical fiber;
    positioning a non-linear crystal in the path of such transmitted light at the other end of the optical fiber; and
    rotating the crystal about its longitudinal axis relative to the fiber to optimize frequency mixing of the transmitted light;
    whereby the transmitted light has a wavelength within the 600 to 800 nanometer range and the provided light from said non-linear crystal has a wavelength in the ultraviolet range.

8. The method of claim: 7 which further includes the step of orienting said crystal at Brewster's angle.

* * * * *